United States Patent
Lev et al.

(10) Patent No.: US 7,518,861 B2
(45) Date of Patent: Apr. 14, 2009

(54) DEVICE COOLING SYSTEM

(75) Inventors: Jeffrey A. Lev, Cypress, TX (US); Mark S. Tracy, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 67 days.

(21) Appl. No.: 11/788,462

(22) Filed: Apr. 20, 2007

(65) Prior Publication Data

US 2008/0259557 A1  Oct. 23, 2008

(51) Int. Cl.
  *H05K 7/20* (2006.01)
(52) U.S. Cl. .................. 361/687; 361/695; 361/700; 165/80.3; 165/80.4; 165/104.33; 165/185
(58) Field of Classification Search ................ 361/687, 361/689, 699–704, 707, 709, 719; 165/80.3, 165/80.4, 104.21, 104.26, 104.33, 185; 257/706–727; 174/15.1, 15.2, 16.1, 16.3, 252
See application file for complete search history.

(56) References Cited

U.S. PATENT DOCUMENTS

| | | | |
|---|---|---|---|
| 5,198,889 A * | 3/1993 | Hisano et al. ............... 257/678 |
| 5,216,580 A | 6/1993 | Davidson et al. | |
| 5,329,993 A | 7/1994 | Ettehadieh | |
| 5,522,455 A * | 6/1996 | Brown et al. ........... 165/104.26 |
| 5,566,377 A | 10/1996 | Lee | |
| 6,058,009 A | 5/2000 | Hood, III et al. | |
| 6,226,178 B1 | 5/2001 | Broder et al. | |
| 6,288,895 B1 | 9/2001 | Bhatia | |
| 6,504,720 B2 * | 1/2003 | Furuya ....................... 361/699 |
| 6,917,522 B1 | 7/2005 | Erturk et al. | |
| 7,059,391 B2 * | 6/2006 | Whitney ................ 165/104.33 |
| 7,155,914 B2 | 1/2007 | Ishinabe et al. | |
| 2006/0113662 A1 * | 6/2006 | Cepeda-Rizo ............... 257/714 |
| 2006/0144567 A1 * | 7/2006 | Zhu et al. .............. 165/104.29 |
| 2006/0187638 A1 | 8/2006 | Vinson et al. | |
| 2007/0064387 A1 | 3/2007 | Matsumoto | |

FOREIGN PATENT DOCUMENTS

| | | |
|---|---|---|
| JP | 63-143487 | 6/1988 |
| JP | 403058848 A * | 3/1991 |
| JP | 2004-178117 | 6/2004 |
| WO | WO 01/45163 A1 * | 6/2001 |

* cited by examiner

*Primary Examiner*—Michael V Datskovskiy

(57) ABSTRACT

A device cooling system comprises a heat pipe disposed in a device, the heat pipe having a condenser portion and at least two divergent evaporator portions, the at least two evaporator portions coupled to at least one heat-generating component of the device.

26 Claims, 1 Drawing Sheet

DEVICE COOLING SYSTEM

BACKGROUND

Different types of devices, such as computing and other types of electronic devices, comprise components that generate thermal energy during operation (e.g., graphic cards, processors, etc.). If such devices are not sufficiently cooled, damage to and/or a reduced operating life of the device and/or components thereof can result. Fans and heat exchangers (sometimes in combination with heat pipes) disposed within the device have been used to dissipate thermal energy from within the device. However, because of the location and/or quantity of heat-generating components within the device, as well as space limitations within the device, connecting the heat-generating components to the heat-dissipating elements within the device is difficult.

DETAILED DESCRIPTION OF THE DRAWINGS

Figure 1:
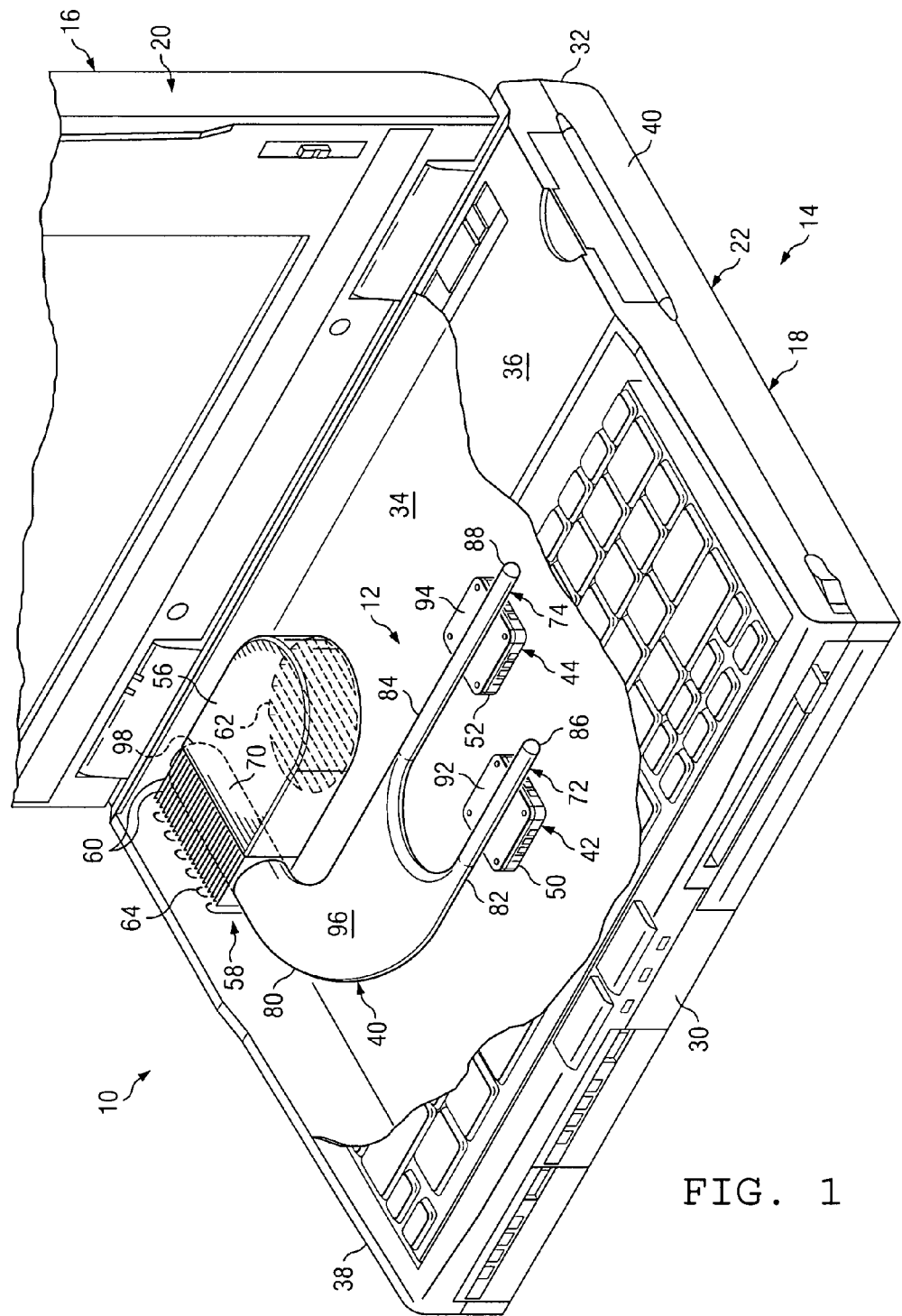
FIG. 1 is a diagram illustrating a device in which an embodiment of a cooling system is employed to advantage.

FIG. 1 is a diagram illustrating a device 10 in which an embodiment of a cooling system 12 is employed to advantage. In the embodiment illustrated in FIG. 1, device 10 comprises a computing device in the form of a notebook computer 14 having a display member 16 rotatably coupled to a base member 18. However, it should be understood that device 10 may comprise other types of devices such as, but not limited to, a tablet computer, a desktop computer, a gaming device, a media player or any other type of portable or non-portable electronic device. In the embodiment illustrated in FIG. 1, display member 16 and base member 18 each comprise a housing 20 and 22, respectively, formed from a number of walls. For example, in the embodiment illustrated in FIG. 1, housing 22 comprises a front wall 30, a rear wall 32, a bottom wall 34, a top wall defining a working surface or keyboard deck 36, and a plurality of side walls 38 and 40.

In the embodiment illustrated in FIG. 1, cooling system 12 comprises a heat pipe 40 disposed within housing 22 of base member 18 for dissipating thermal energy generated by heat-generating components 42 and 44 disposed within housing 22. However, it should be understood that heat pipe 40 may be otherwise located in device 10 (e.g., additionally or alternatively, in display member 16). Heat-generating components 42 and 44 may comprise any type of component of device 10 that generates thermal energy during operation thereof. For example, in some embodiments, heat-generating component 42 comprises a central processing unit (CPU) 50 and heat-generating component 44 comprises a graphics chipset 52. However, it should be understood that heat-generating components 42 and 44 may comprise other types of elements.

In FIG. 1, cooling system 12 also comprises a fan 56 and a heat exchanger 58. In the embodiment illustrated in FIG. 1, heat exchanger 58 comprises a plurality of spaced apart fins 60 for dissipating thermal energy in response to an air flow passing therethrough. For example, in the embodiment illustrated in FIG. 1, housing 22 comprises a vent 62 formed in bottom wall 34 of housing 22 disposed in alignment with fan 56, and a vent 64 disposed in side wall 38 of housing 22 located in alignment with heat exchanger 58. In operation, fan 56 draws an airflow inwardly through vent 62 and discharges and/or exhausts the airflow through fins 60 of heat exchanger 58 and outwardly from housing 22 through vent 64. However, it should be understood that the direction of the airflow generated by fan 56 may be otherwise configured (e.g., reversed in direction from vent 64 to vent 62). Further, it should be understood that the locations of vents 62 and/or 64 may be otherwise configured (e.g., vent 62 may be located in rear wall 32 instead of bottom wall 34).

In the embodiment illustrated in FIG. 1, heat pipe 40 comprises a condenser portion 70 and at least two evaporator portions 72 and 74 for transferring thermal energy generated by heat-generating components 42 and 44 toward heat exchanger 58 where such thermal energy may be dissipated by heat exchanger 58. For example, in some embodiments, heat pipe 40 generally comprises a fluid disposed therein under vacuum that is vaporized in evaporator portions 72 and 74 and condensed in condenser portion 70. In some embodiments, heat pipe 40 generally comprises a wick or other type of element disposed therein for generating capillary-type movement of the vaporized fluid from evaporator portions 72 and 74 toward heat exchanger 58 and for transferring the condensed fluid from heat exchanger 58 toward evaporator portions 72 and 74. However, it should be understood that other types of heat pipes may be used. In the embodiment illustrated in FIG. 1, heat pipe 40 comprises an intermediate portion 80 disposed between evaporator portion 72 and 74 and condenser portion 70. In FIG. 1, evaporator portions 72 and 74 diverge from intermediate portion 80 to form two heat pipe branches 82 and 84 having respective terminating ends 86 and 88. In the embodiment illustrated in FIG. 1, branches 82 and 84 diverge from intermediate portion 80 to form two separate and spaced apart evaporator portions 72 and 74. However, it should be understood that a greater number of branches and/or condenser portions may be formed on heat pipe 40. For example, in some embodiments, heat pipe 40 may be manufactured having additional branches diverging from intermediate portion 80. Further, in some embodiments, a particular branch 82 and/or 84 may further diverge to form additional branches.

In the embodiment illustrated in FIG. 1, evaporator portions 72 and 74 are thermally coupled to respective heat-generating components 42 and 44 (e.g., by respective thermally conductive plates 92 and 94 or otherwise). In FIG. 1, heat-generating components 42 and 44 are coupled to an intermediate portion of respective evaporator portions 72 and 74. However, it should be understood that heat-generating components 42 and/or 44 may be thermally coupled to respective evaporator portions 72 and 74 at other locations. Further, in the embodiment illustrated in FIG. 1, evaporator portion 72 and 74 are each coupled to a separate heat-generating component (e.g., components 42 and 44, respectively). However, it should be understood that evaporator portion 72 and 74 may also be coupled to different portions of a single or same heat-generating component. Further, either or both of evaporator portions 72 and 74 may be coupled to more than one heat-generating component.

In the embodiment illustrated in FIG. 1, intermediate portion 80 of heat pipe 40 comprises a reservoir portion 96 for receiving evaporative fluid input from evaporator portions 72 and/or 74 and for receiving condensed fluid input from condenser portion 70. For example, in operation, capillary movement of fluid within heat pipe 40 causes condensed fluid to travel in a direction from end 98 of heat pipe 40 toward ends 86 and 88 of heat pipe 40, and evaporated fluid to travel in a direction from ends 86 and 88 of heat pipe 40 toward end 98 of heat pipe 40. Thus, for example, fluid within heat pipe 40 is condensed at condenser portion 70 and travels within heat pipe 40 to reservoir portion 96 where such condensed fluid diverges to evaporator portions 72 and 74. Similarly, evaporated fluid within heat pipe 40 converges from evaporator portions 72 and 74 into reservoir portion 96 where such evaporated fluid is transferred toward heat exchanger 58 where the evaporated fluid is cooled by the air flow generated by fan 56 and passing through fins 60 of heat exchanger 58, thereby changing the state of the fluid.

In the embodiment illustrated in FIG. 1, at least a portion of evaporator portion 72 and 74 are disposed parallel (parallel or substantially parallel) to each other. However, it should be understood that branches 82 and 84 of heat pipe 40 may be configured to diverge in different directions (e.g., parallel or non-parallel to each other). In the embodiment illustrated in FIG. 1, heat pipe 40 is configured such that condenser portion 70 has a generally larger cross-sectional area than a cross-sectional area of evaporator portion 72 and/or 74 to accommodate a larger volume of fluid therein. However, it should be understood that in some embodiments, the configuration of heat pipe 40 may be different (e.g., condenser portion 70 may be formed having a greater length to accommodate a particular volume of fluid therein such that a cross-sectional area of condenser portion 70 may be equal to or less than a cross-sectional area of evaporator portions 72 and/or 74). Further, in the embodiment illustrated in FIG. 1, evaporator portions 72 and 74 are illustrated as having a same size and/or cross-sectional area (the same or substantially the same size/shape). However, it should be understood that the shape and/or cross-sectional area of evaporator portions 72 and 74 may be different from each other.

Thus, embodiments of cooling system 12 provide a dynamic heat-dissipating system that is responsiveness to different levels of heat generation of components within device 10. For example, in the embodiment illustrated in FIG. 1, it should be understood that heat-generating components 42 and 44 may be generating different levels of thermal energy (or even different portions of a single heat-generating component may be generating different levels of thermal energy). In this example, the particular branch 82 or 84 corresponding to the heat-generating component generating greater levels of heat would experience greater fluid movement therethrough to dissipate the increased level of thermal energy. Thus, embodiments of cooling system 12 may be manufactured to enable heat to be received by at least two different evaporator portions and transferred to a single condenser portion 70 that is dynamically responsive to varying levels of heat generation by the corresponding heat-generating components.

What is claimed is:

1. A device cooling system, comprising:
   a heat pipe disposed in a computing device, the heat pipe having a fluid that is condensed in a condenser portion and that is vaporized in at least two divergent evaporator portions, the at least two evaporator portions coupled to a plurality of heat-generating component of the device; and
   a heat exchanger coupled to the condenser portion, wherein a fan generates an airflow to the heat exchanger and a first vent in the computing device aligns with the fan and a second vent in the computing device aligns with the heat exchanger.

2. The system of claim 1, wherein the fan draws the airflow inwardly through the first vent and discharges the airflow through fins of the heat exchanger and outwardly through the second vent.

3. The system of claim 1, wherein the heat pipe comprises an intermediate portion configured to receive evaporative fluid input from each of the at least two evaporator portions.

4. The system of claim 1, wherein the heat pipe comprises a reservoir portion disposed between the condenser portion and a location of divergence of the at least two evaporator portions.

5. The system of claim 1, wherein a cross-sectional area of the condenser portion is greater than a cross-sectional area of at least one of the at least two evaporator portions.

6. The system of claim 1, wherein the at least two evaporator portions are disposed parallel to each other.

7. The system of claim 1, wherein the computing device comprises one of a notebook computer, a desktop computer, and a tablet computer.

8. A method for manufacturing a device cooling system, comprising:
   providing a heat pipe having a condenser portion that condenses a fluid and at least two divergent evaporator portions that vaporize the fluid;
   coupling the at least two evaporator portions to a plurality of heat-generating component of a computing device;
   providing a heat exchanger coupled to the condenser portion; and
   providing a fan that generates an airflow to the heat exchanger, wherein a first vent in the computing device aligns with the fan and a second vent in the computing device aligns with the heat exchanger.

9. The method of claim 8, wherein the fan draws the airflow inwardly through the first vent and discharges the airflow through fins of the heat exchanger and outwardly through the second vent.

10. The method of claim 8, further comprising providing the heat pipe having an intermediate portion configured to receive evaporative fluid input from each of the at least two evaporator portions.

11. The method of claim 8, further comprising providing the heat pipe having a reservoir portion disposed between the condenser portion and a location of divergence of the at least two evaporator portions.

12. The method of claim 8, Further comprising providing the heat pipe having a cross-sectional area of the condenser portion greater than a cross-sectional area of at least one of the at least two evaporator portions.

13. The method of claim 8, further comprising providing the heat pipe having the at least two evaporator portions disposed parallel to each other.

14. The method of claim 8, further comprising disposing the heat pipe in one of a notebook computer, a desktop computer, and a tablet computer.

15. A device cooling system, comprising:
    a heat pipe disposed in a computing device, the heat pipe comprising first and second evaporator portions vaporizing fluid and each coupled to a different heat-generating component of the device for transferring thermal energy therefrom, the first and second evaporator portions each coupled to a condenser portion condensing the fluid of the heat pipe; and
    a heat exchanger coupled to the condenser portion, wherein a fan generates an airflow to the heat exchanger, and a first vent in the computing device aligns with the fan and a second vent in the computing device aligns with the heat exchanger.

16. The system of claim 15, wherein the fan draws the airflow inwardly through the first vent and discharges the airflow through fins of the heat exchanger and outwardly through the second vent.

17. The system of claim 15, wherein the heat pipe comprises a reservoir portion disposed between the condenser portion and the first and second evaporator portions.

18. The system of claim 15, wherein the heat pipe comprises an intermediate portion configured to receive evaporative fluid input from each of the first and second evaporator portions.

19. The system of claim 15, wherein a cross-sectional area of the condenser portion is greater than a cross-sectional area of at least one of the first and second evaporator portions.

20. The system of claim 15, wherein at least a portion of the first and second evaporator portions are disposed parallel to each other.

21. A device cooling system, comprising:
a heat pipe disposed in a computing device, the heat pipe comprising a condenser portion that condenses fluid in the heat nine and a plurality of branches in fluid communication with the condenser portion, the plurality of branches each terminating at an evaporator portion that vaporizes the fluid of the heat pipe;
a heat exchanger coupled to the condenser portion; and
a fan that generates an airflow to the heat exchanger, wherein a First vent in the computing device aligns with the fan and a second vent in the computing device aligns with the heat exchanger.

22. The system of claim 21, wherein the heat pipe comprises a reservoir portion disposed between the condenser portion and the plurality of branches.

23. The system of claim 21, wherein the heat pipe comprises an intermediate portion configured to receive evaporative fluid input from each of the plurality of first and second branches.

24. The system of claim 21, wherein a cross-sectional area of the condenser portion is greater than a cross-sectional area of at least one of the plurality of branches.

25. The system of claim 21, wherein at least a portion of each of the plurality of branches are disposed parallel to each other.

26. The system of claim 21, wherein the evaporator portion of each of the plurality of branches are coupled to a different heat-generating component of the device.

* * * * *

UNITED STATES PATENT AND TRADEMARK OFFICE
CERTIFICATE OF CORRECTION

PATENT NO. : 7,518,861 B2  Page 1 of 1
APPLICATION NO. : 11/788462
DATED : April 14, 2009
INVENTOR(S) : Jeffrey A. Lev et al.

It is certified that error appears in the above-identified patent and that said Letters Patent is hereby corrected as shown below:

In column 4, line 11, in Claim 7, after "desktop" delete "computer." and insert -- computer, --, therefor.

In column 4, line 23, in Claim 8, delete "exchanger." and insert -- exchanger, --, therefor.

In column 4, line 38, in Claim 12, delete "Further" and insert -- further --, therefor.

In column 4, line 56, in Claim 15, delete "portion." and insert -- portion, --, therefor.

In column 5, line 14, in Claim 21, delete "nine" and insert -- pipe --, therefor.

In column 5, line 20, in Claim 21, delete "First" and insert -- first --, therefor.

Signed and Sealed this

First Day of September, 2009

David J. Kappos
*Director of the United States Patent and Trademark Office*